United States Patent [19]

Beamer

[11] Patent Number: 5,129,446
[45] Date of Patent: Jul. 14, 1992

[54] AIR/LIQUID HEAT EXCHANGER

[75] Inventor: Henry E. Beamer, Middleport, N.Y.

[73] Assignee: General Motors Corporation, Detroit, Mich.

[21] Appl. No.: 740,734

[22] Filed: Aug. 6, 1991

Related U.S. Application Data

[63] Continuation-in-part of Ser. No. 653,838, Feb. 11, 1991, abandoned.

[51] Int. Cl.⁵ .......................... B64D 33/10; F28D 5/00
[52] U.S. Cl. ........................................ 165/41; 165/149;
165/911; 62/241; 62/259.4; 62/304; 62/DIG.
5; 123/41.01; 261/153; 244/57

[58] Field of Search .................... 165/41, 44, 911, 149;
62/304, 259.4, 241, DIG. 5; 123/41.01;
261/153; 244/57

[56] References Cited

U.S. PATENT DOCUMENTS

| 2,925,722 | 2/1960 | Blackburn et al. | 62/DIG. 5 |
| 3,769,947 | 11/1973 | Crain | 123/41.01 |
| 4,031,710 | 6/1977 | Rideout | 62/171 |
| 4,494,384 | 1/1985 | Lott | 62/279 |
| 4,619,313 | 10/1986 | Rhodes et al. | 165/149 |

Primary Examiner—Albert W. Davis, Jr.
Attorney, Agent, or Firm—Ronald L. Phillips

[57] ABSTRACT

An air/liquid heat exchanger having a tube that reinforces the heat exchanger's core and header plates and also sprays a liquid onto the core for evaporative cooling.

10 Claims, 3 Drawing Sheets

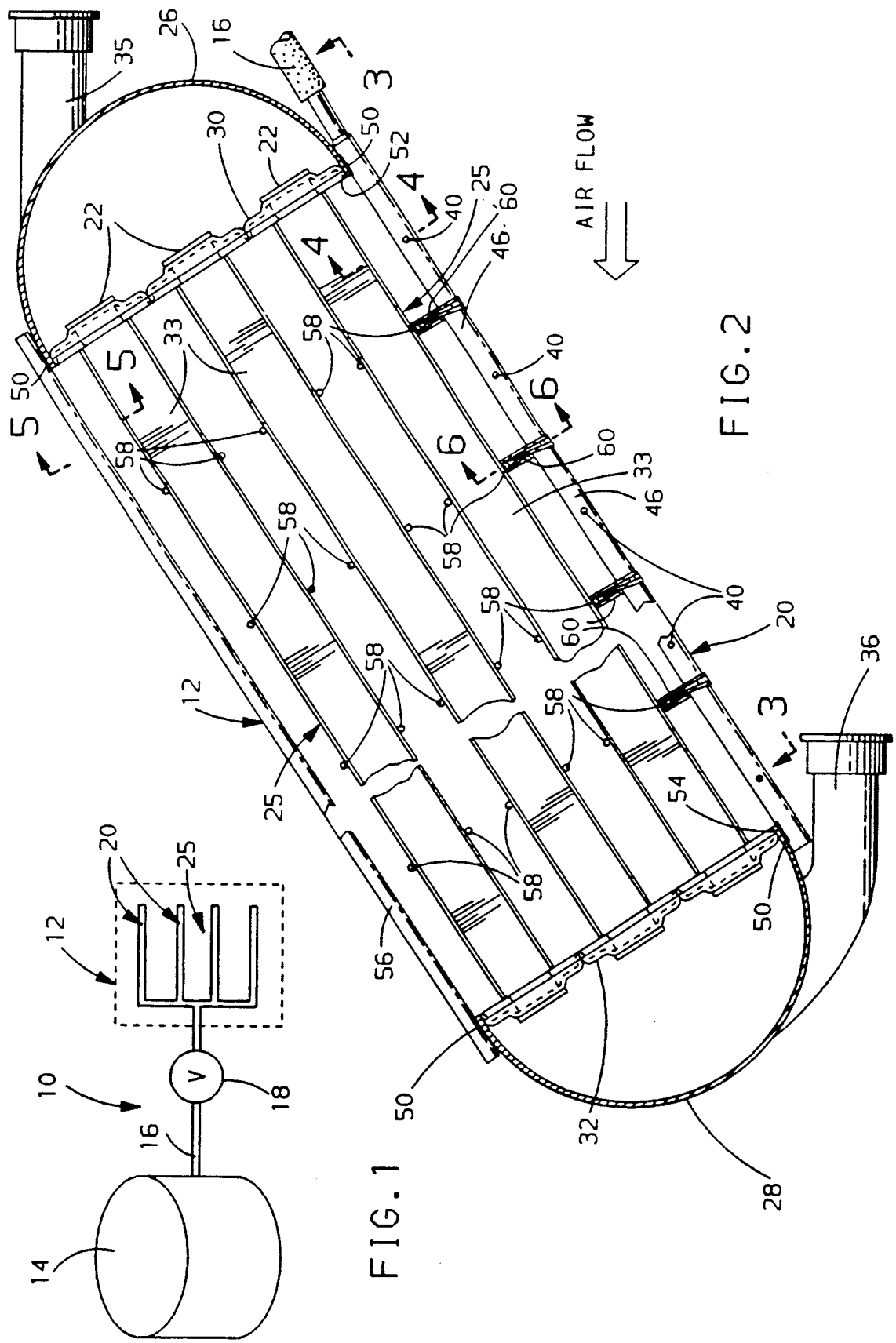

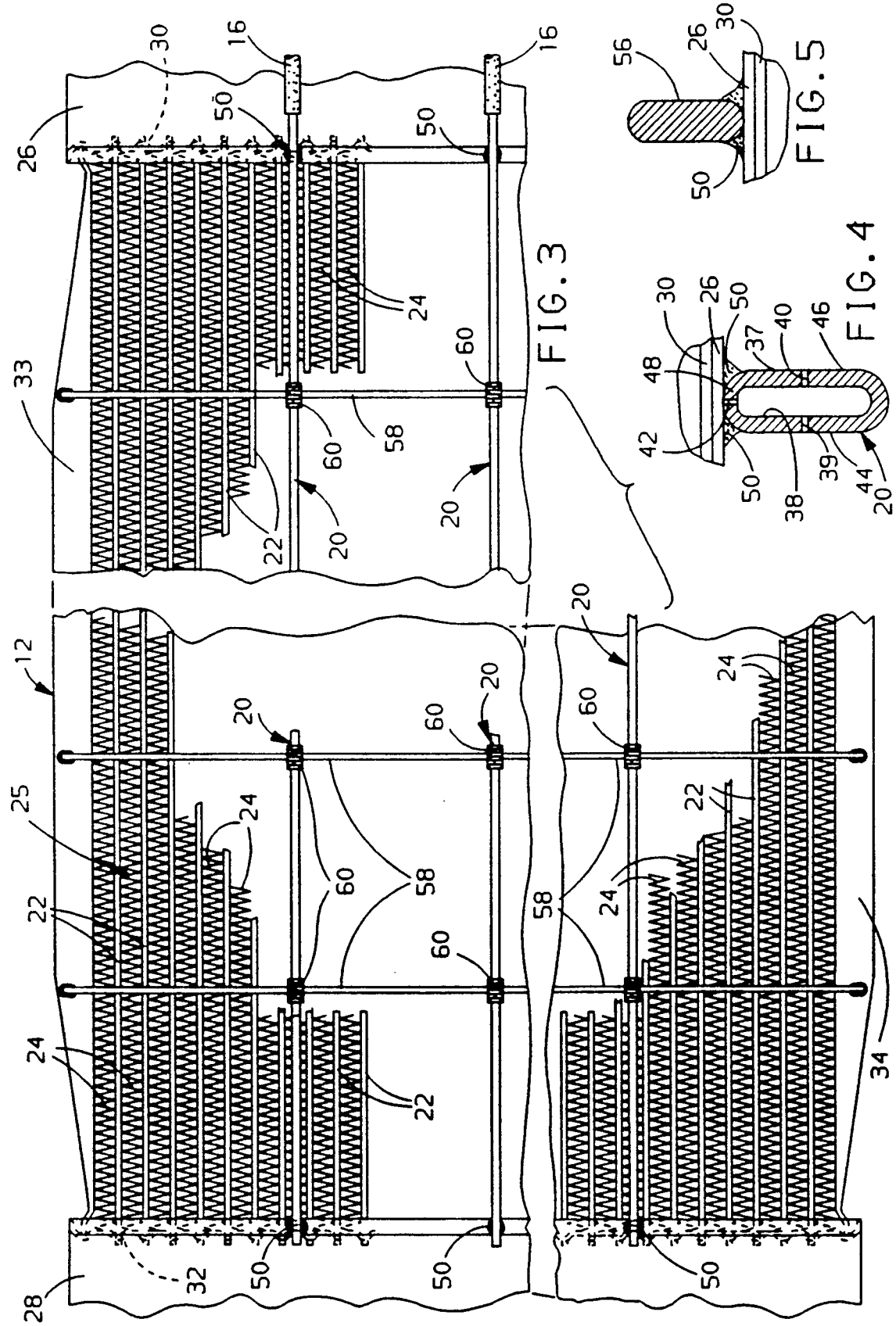

AIR/LIQUID HEAT EXCHANGER

This is a continuation-in-part of application Ser. No. 07/653,838 filed Feb. 11, 1991 now abandoned.

TECHNICAL FIELD

This invention relates to air/liquid heat exchangers and more particularly to those for high performance engines.

BACKGROUND OF THE INVENTION

One way of significantly enhancing the performance of air/liquid heat exchangers is to install one or more spray bars to spray a liquid onto their heat transfer surface to thereby utilize the latent heat of evaporation of this liquid to boost the heat transfer. The sprayed liquid is vaporized as it passes through the air side flow circuit of the heat exchanger, and the heat removed through evaporation is added to the sensible heat normally removed by the cooling air. This performance enhancement can be used to increase the overall heat transfer capacity of the heat exchanger and/or reduce the cooling air mass flow required while maintaining constant heat transfer performance.

For example, in high performance piston engine powered/propeller driven aircraft where sufficient heat transfer performance is available to cool the engine(s) without evaporative cooling, a very significant reduction in the air drag on the aircraft can be achieved with the addition of evaporative cooling by the resulting reduction in the cooling air then required for the heat exchanger(s). This can be a very significant advantage recognizing that the heat exchanger(s) on a high performance aircraft can represent as much as about 50% of the total drag. Moreover, some high performance automotive as well as aircraft engines require higher cooling system operating pressures (e.g. 50 psi) to prevent water pump cavitation due to increased coolant flow requirements and the design of the water pump passages. And most special high performance radiators that meet these high pressure requirements have lower heat transfer capacity than conventional high efficiency passenger cars at these pressures. In order to operate the latter radiators at these high pressures, it has been the practice to install tie rods that limit core and header plate deflection to provide acceptable durability. But then these reinforcement rods when arranged across the core face also adversely add air flow restriction.

SUMMARY OF THE INVENTION

The present invention combines the heretofore separate functions of spray bars and tie rods into a very simple single component that maximizes their advantages and minimizes their disadvantages. This is accomplished with a tube that is formed with a streamlined cross section and with orifices spaced along the length thereof. One or more of these tubes is arranged to extend across the upstream core face between the two headers and is attached to the latter. The number of tubes, orifices and their sizes are determined to provide the required core and header reinforcement, spray pattern and flow vs. supply pressure characteristics.

It is therefore an object of the present invention to provide a new and improved air/liquid heat exchanger having a multifunction component that both reinforces the heat exchanger's core and headers and provides for evaporative cooling at the heat exchanger's heat transfer surface.

Another object is to provide an air/liquid heat exchanger having a spray/reinforcement tube that is attached to the heat exchanger's headers and has a streamline cross section that extends across the upstream face of the heat exchanger's core and longitudinally spaced orifices for spraying a liquid onto the heat exchanger's heat transfer surface.

These and other objects, advantages and features of the present invention will become more apparent from the following detailed description and accompanying drawing.

BRIEF DESCRIPTION OF THE DRAWING

FIG. 1 is a schematic view of a liquid spray system for the radiator shown in FIG. 2.

FIG. 2 is a side elevation with parts broken away of a radiator embodying the preferred embodiment of the present invention.

FIG. 3 is an enlarged view taken on the line 3—3 in FIG. 2.

FIG. 4 is an enlarged view taken on the line 4—4 in FIG. 2.

FIG. 5 is an enlarged view taken on the line 5—5 in FIG. 2.

DESCRIPTION OF THE PREFERRED EMBODIMENT

Figure 6:
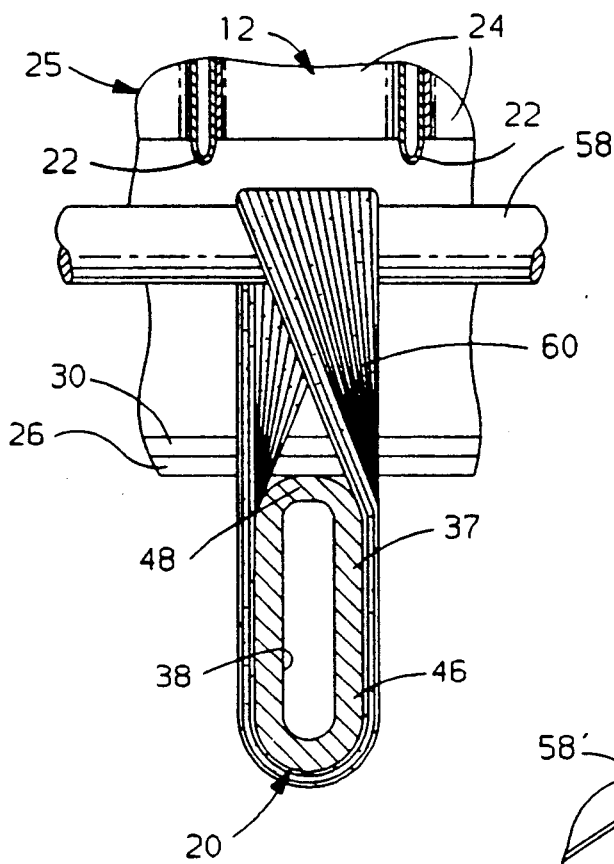
FIG. 6 is an enlarged view taken on the line 6—6 in FIG. 2.

Referring to FIGS. 1, 2 and 3, there is shown an evaporative cooling system 10 for a radiator 12 of a high performance piston engine powered/propeller driven aircraft (not shown). The system 10 generally comprises a reservoir 14 connected by a pipeline 16 having a valve 18 to a plurality of spray/reinforcement tubes 20 arranged across the upstream face of the radiator. The radiator 12 generally comprises three rows of interleaved tubes 22 and louvered air centers 24 forming a core 25 and a pair of tanks 26 and 28, each having a header plate(s) 30 and 32 connected to the opposite ends of the tubes 22. Reinforcement side rails 33 and 34 located on opposite sides of each of the tube rows are brazed or welded at their opposite ends to the header plates 30 and 32, and an inlet pipe 35 and outlet pipe 36 connected to the respective tanks 26 and 28 connect the radiator with the engine's cooling circuit.

The spray/reinforcement tubes 20 are all identical and have a streamline oval cross section 37, central longitudinal passage 38, and three rows of orifices 39, 40 and 42 intersecting with the central passage and opening to atmosphere through the opposing flat tube sides 44 and 46 and one of the rounded tube edges 48 as seen in FIGS. 2 and 4. The tubes 20 extend parallel to each other across the upstream face of the radiator core 25 and are attached to the tanks 26 and 28 directly outboard of the respective header plates 30 and 32 by welds 50 as shown in FIG. 4. Or they may be directly attached to the headers by locating the tanks inward of the flange 52 and 54 of the respective headers and flanging the tanks for mating with the headers inboard of the margin of the latter. Further reinforcement of the core is provided by solid tie bars 56 arranged and attached like the spray/reinforcement tubes 20 but on the backside (see FIGS. 2 and 5) and by tie rods 58 across both faces of the core. The tie rods 58 extend transverse to the tubes 20 and tie bars 56 and are welded at their ends to the side rails 33 and 34.

Figure 7:
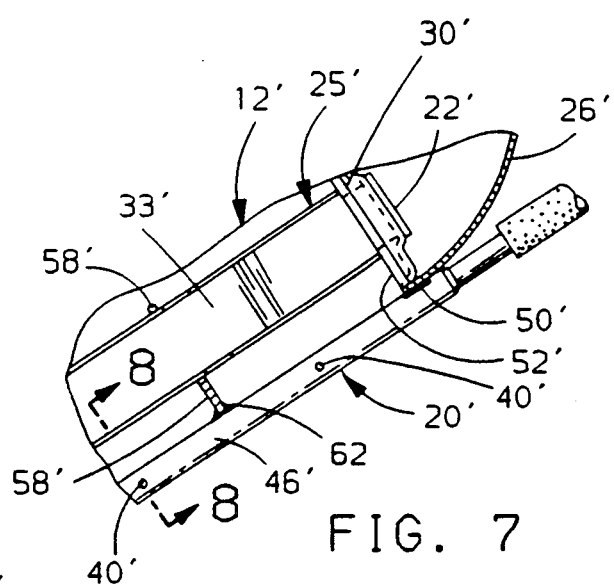
FIG. 7 is a view similar to FIG. 2 but partially so and of another way of attaching the spray/reinforcement tubes to the tie rods.
Figure 8:
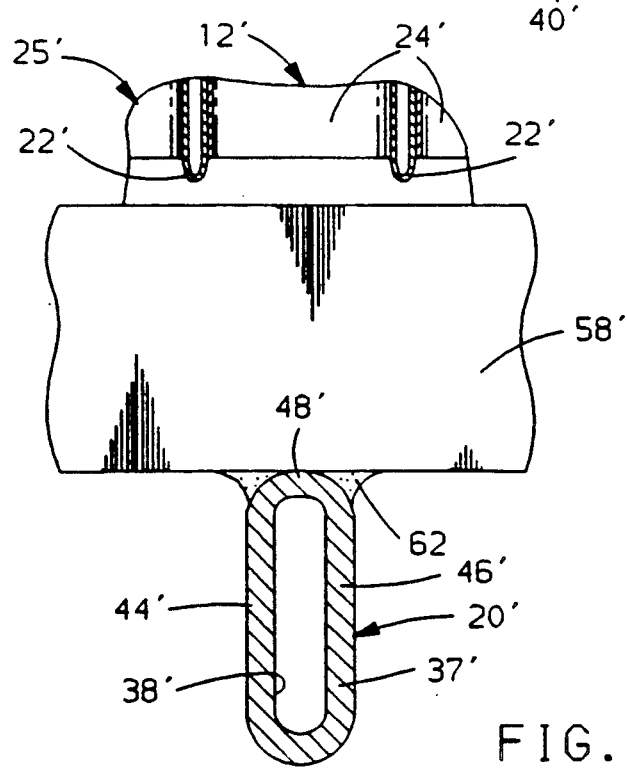
FIG. 8 is an enlarged view taken on the line 8—8 in FIG. 7.

At high air flows, the integral spray/reinforcement tubes 20 are susceptible to air flow induced flutter. To prevent this, the tubes 20 are attached to the transversely extending tie rods 58 adjacent thereto at the points where the rods and tubes cross each other. The manner of attachment can take various forms. For example, tie wraps 60 formed of unidirectional FIBERGLAS TM saturated with epoxy resin can be used to attach the rods and tubes as shown in FIGS. 2 and 6. Another form of attachment is shown in FIGS. 7 and 8 wherein parts similar to those previously described are identified by the same numerals only primed. In this embodiment, the tie rods 58' are constructed from flat sheet or bar stock that is dimensioned to contact the tubes 20' where they cross. This enables the rods and tubes to then be simply attached by a tack weld 62 at their crossing points and results in a stiff, flutter resistant structure. Furthermore, the tie bars 58' can, like the tubes 20', be streamlined with an airfoil shape to minimize aerodynamic drag.

The orifices are all spaced at equal distances along the length of the respective tubes with the intermediate row of orifices 42 in the rounded tube edge directly facing the upstream core face and the two outer rows of orifice 39 and 40 in the flat tube sides at right angles thereto so that they spray transversely into the air flow to the core. The result of this three row orifice arrangement is a wide spray pattern from each tube across and onto the heat transfer surface of the core. The number of tubes and orifices and the size(s) (diameter) of the orifices are determined by conventional flow analysis procedures to provide the required spray flow vs. supply pressure characteristics. For example, these characteristics can be sized to provide the required spray flow (evaporative cooling) utilizing ram air pressure from the aircraft's airframe acting directly on the liquid in the reservoir 14. In the case of the aircraft application as shown, the liquid is preferably water or a water-alcohol solution or may even be a refrigerant for even greater heat transfer enhancement and with the stagnation pressure of the ram air sufficient to provide the required liquid flow rate, the valve 18 may be either a needle valve or fixed orifice as a regulator valve is not then required. This is in addition to the elimination of the complexity, weight and power consumption of a separate pump to power the spray tubes.

The overall air side pressure drop of the above aircraft radiator spray/reinforcement tube installation is minimized because a separate set of spray bars is not exposed to the airstream and because the spray tubes that are additionally used for that purpose (reinforcement) have a streamline shape. The resulting pressure drop improvement increases the maximum air flow rate achievable which increases the maximum heat transfer capacity and reduces the drag on the aircraft for constant heat transfer. Moreover, the integral spray and reinforcement component results in a very compact installation in the aircraft characterized by small space requirements directly in front of the radiator. Furthermore, system reliability is improved due to the simplicity of the above arrangement.

The improved aircraft performance that can result from use of the above spray/reinforcement tube installation can be very significant. For example, with the heat transfer performance of the radiator being sufficient without the above added evaporative cooling, it is projected that the cooling air required in a special engine powered/propeller driven aircraft designed to challenge the speed record can be reduced by over 25% resulting in a significant reduction in the heat exchanger induced aerodynamic drag on the aircraft.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. For example, the spray/reinforcement tube is also applicable to other air/liquid heat exchangers such as an air side oil cooler or special condenser requiring high heat transfer capacity for only short time durations. All such modifications and variations are within the scope of the invention as determined by the appended claims when interpreted in accordance with the breadth to which they are fairly, legally and equitably entitled.

What is claimed is:

1. An air/liquid heat exchanger comprising a plurality of interleaved tubes and air centers, a pair of tanks having header plates joined to opposite ends of said tubes, said tubes and air centers forming a core having an upstream face, at least one spray/reinforcement tube extending across said upstream face between said header plates, means rigidly connecting said spray/reinforcement tube to said header plates, said spray/reinforcement tube having a longitudinally extending passage and a plurality of orifices connected to said passage and open to atmosphere, said orifices being spaced along the length of said spray/reinforcement tube and extending in a direction to deliver a liquid supplied to said passage into an air flow directed to said upstream core face whereby said spray/reinforcement tube serves to both reinforce said core and header plates and spray liquid onto the core for evaporative cooling.

2. An air/liquid heat exchanger comprising a plurality of interleaved tubes and air centers, a pair of tanks having header plates joined to opposite ends of said tubes, said tubes and air centers forming a core having an upstream face, at least one spray/reinforcement tube extending across said upstream face between said header plates, means rigidly connecting said spray/reinforcement tube to said header plates, said spray/reinforcement tube having a longitudinally extending passage and a plurality of orifices connected to said passage and open to atmosphere, said orifices being spaced along the length of said spray/reinforcement tube with some of said orifices extending in a direction toward said upstream core face and other of said orifices extending in opposite directions transverse to said upstream core face so as to deliver a liquid supplied to said passage into an air flow directed to said upstream core face whereby said spray/reinforcement tube serves to both reinforce the core and header plates and spray liquid onto the core for evaporative cooling.

3. An air/liquid heat exchanger comprising a plurality of interleaved tubes and air centers, a pair of tanks having header plates joined to opposite ends of said tubes, said tubes and air centers forming a core having an upstream face, a plurality of spray/reinforcement tubes extending in parallel relationship across said upstream face between said header plates, means rigidly connecting said spray/reinforcement tubes to said header plates, said spray/reinforcement tubes each having a longitudinally extending passage and three rows of orifices connected to said passage and open to atmosphere, said orifices being spaced along the length of the respective spray/reinforcement tubes and said rows being spaced thereabout so that the orifices in one of said rows extend in a direction toward said upstream core face and the orifices in the other two rows extend in opposite directions transverse to said upstream core face so as to deliver a liquid supplied to said passage into an air flow directed to said upstream core face whereby said spray/reinforcement tubes serve to both reinforce the core and header plates and spray liquid onto the core for evaporative cooling.

4. A radiator for a high performance piston engine powered/propeller driven aircraft comprising a plurality of interleaved tubes and air centers, a pair of tanks having header plates joined to opposite ends of said tubes, said tubes and air centers forming a core having an upstream face, at least one spray/reinforcement tube extending across said upstream face between said header plates, means rigidly connecting said spray/reinforcement tube to said header plates, said spray/reinforcement tube having a longitudinally extending passage and a plurality of orifices connected to said passage and open to atmosphere, said orifices being spaced along the length of said spray/reinforcement tube and extending in a direction to deliver a liquid supplied to said passage into an air flow directed to said upstream core face whereby said spray/reinforcement tube serves to both reinforce said core and header plates and spray liquid onto the core for evaporative cooling.

5. An air/liquid heat exchanger comprising a plurality of interleaved tubes and air centers, a pair of tanks having header plates joined to opposite ends of said tubes, said tubes and air centers forming a core having an upstream face, a pair of reinforcement members sandwiching said core and fixed at opposite ends thereof to said header plates, a plurality of tie rods extending across said upstream face and fixed at opposite ends to said reinforcement members, at least one spray/reinforcement tube extending across said tie rods and upstream face between said header plates, means rigidly connecting said spray/reinforcement tube to said header plates, means rigidly connecting said spray/reinforcement tube to said tie rods at each point where they cross, said spray/reinforcement tube having a longitudinally extending passage and a plurality of orifices connected to said passage and open to atmosphere, said orifices being spaced along the length of said spray/reinforcement tube and extending in a direction to deliver a liquid supplied to said passage into an air flow directed to said upstream core face whereby said spray/reinforcement tube serves to both reinforce said core and header plates and spray liquid onto the core for evaporative cooling.

6. An air/liquid heat exchanger comprising a plurality of interleaved tubes and air centers, a pair of tanks having header plates joined to opposite ends of said tubes, said tubes and air centers forming a core having an upstream face, a pair of reinforcement members sandwiching said core and fixed at opposite ends thereof to said header plates, a plurality of tie rods extending across said upstream face and fixed at opposite ends to said reinforcement members, at least one spray/reinforcement tube extending across said tie rods and upstream face between said header plates, means rigidly connecting said spray/reinforcement tube to said header plates, means rigidly connecting said spray reinforcement tube to said tie rods at each point where they cross, said spray/reinforcement tube having a longitudinally extending passage and a plurality of orifices connected to said passage and open to atmosphere, said orifices being spaced along the length of said spray/reinforcement tube with some of said orifices extending in a direction toward said upstream core face and other of said orifices extending in opposite directions transverse to said upstream core face so as to deliver a liquid supplied to said passage into an air flow directed to said upstream core face whereby said spray/reinforcement tube serves to both reinforce the core and header plates and spray liquid onto the core for evaporative cooling.

7. An air/liquid heat exchanger comprising a plurality of interleaved tubes and air centers, a pair of tanks having header plates joined to opposite ends of said tubes, said tubes and air centers forming a core having an upstream face, a pair of reinforcement members sandwiching said core and fixed at opposite ends thereof to said header plates, a plurality of tie rods extending across said upstream face and fixed at opposite ends to said reinforcement members, a plurality of spray/reinforcement tubes extending in parallel relationship across said tie rods upstream face between said header plates, means rigidly connecting said spray/reinforcement tubes to said header plates, means rigidly connecting said spray/reinforcement tubes to said tie rods at each point where they cross, said spray/reinforcement tubes each having a longitudinally extending passage and three rows of orifices connected to said passage and open to atmosphere, said orifices being spaced along the length of the respective spray/reinforcement tubes and said rows being spaced thereabout so that the orifices in one of said rows extend in a direction toward said upstream core face and the orifices in the other two rows extend in opposite directions transverse to said upstream core face so as to deliver a liquid supplied to said passage into an air flow directed to said upstream core face whereby said spray/reinforcement tubes serve to both reinforce the core and header plates and spray liquid onto the core for evaporative cooling.

8. A radiator for a high performance piston engine powered/propeller driven aircraft comprising a plurality of interleaved tubes and air centers, a pair of tanks having header plates joined to opposite ends of said tubes, said tubes and air centers forming a core having an upstream face, a pair of reinforcement members sandwiching said core and fixed at opposite ends thereof to said header plates, a plurality of tie rods extending across said upstream face and fixed at opposite ends to said reinforcement members, at least one spray/reinforcement tube extending across said upstream face between said header plates, means rigidly connecting said spray/reinforcement tube to said header plates, means rigidly connecting said spray/reinforcement tubes to said tie rods at each point where they cross, said spray/reinforcement tube having a longitudinally extending passage and a plurality of orifices connected to said passage and open to atmosphere, said orifices being spaced along the length of said spray/reinforcement tube and extending in a direction to deliver a liquid supplied to said passage into an air flow directed to said upstream core face whereby said spray/reinforcement tube serves to both reinforce said core and header plates and spray liquid onto the core for evaporative cooling.

9. A radiator as set forth in claim 8 wherein the means connecting said spray/reinforcement tubes and tie rods is unidirectional FIBERGLAS saturated with an epoxy resin.

10. A radiator as set forth in claim 8 wherein the means connecting said spray/reinforcement tubes and tie rods is a weld.

* * * * *